(12) United States Patent
Halsmer et al.

(10) Patent No.: US 8,128,074 B2
(45) Date of Patent: Mar. 6, 2012

(54) AUTOMATIC TENSIONING MOUNT FOR BELTS

(75) Inventors: Matthew A Halsmer, Waukesha, WI (US); Jonathan C Boomgaarden, Waukesha, WI (US); Lori A Schultz, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 11/559,473

(22) Filed: Nov. 14, 2006

(65) Prior Publication Data
US 2008/0113836 A1    May 15, 2008

(51) Int. Cl.
*F16F 1/00* (2006.01)
(52) U.S. Cl. .......................................... 267/73
(58) Field of Classification Search ............... 474/117; 242/420.2, 422.6–422.8; 74/89.22; 267/71, 267/69, 73; 254/100; 73/862.53; *B25J 9/02*
See application file for complete search history.

(56) References Cited

U.S. PATENT DOCUMENTS

| | | | | |
|---|---|---|---|---|
| 629,290 | A | * | 7/1899 | Goodbaudy ............... 73/862.57 |
| 1,037,589 | A | * | 9/1912 | Browning ........................ 267/71 |
| 1,077,339 | A | * | 11/1913 | Farrell .......................... 474/138 |
| 1,408,955 | A | * | 3/1922 | Lopez .............................. 267/71 |
| 1,835,617 | A | * | 12/1931 | Stewart .............................. 57/99 |
| 1,950,882 | A | * | 3/1934 | Gianini .................... 73/862.621 |
| 2,182,267 | A | * | 12/1939 | Scusa ....................... 73/862.453 |
| 2,634,780 | A | * | 4/1953 | Barnes ........................... 152/237 |
| 2,816,439 | A | * | 12/1957 | Hayes ............................... 73/81 |
| 3,155,383 | A | | 11/1964 | Whitmore |
| 3,866,854 | A | * | 2/1975 | Wehner ....................... 242/382.1 |
| 4,021,715 | A | | 5/1977 | Von Hacht et al. |
| 4,217,776 | A | * | 8/1980 | McCall ....................... 73/862.53 |
| 4,537,084 | A | * | 8/1985 | Passemard et al. .......... 74/89.22 |
| 4,630,872 | A | | 12/1986 | Teramachi |
| 4,671,728 | A | | 6/1987 | Clark et al. |
| H000313 | H | | 7/1987 | Staudenmann et al. |
| 4,769,565 | A | | 9/1988 | Teramachi |
| 4,934,884 | A | * | 6/1990 | Rooke ............................... 411/8 |
| 4,964,479 | A | * | 10/1990 | Sumida ......................... 177/233 |
| 5,002,518 | A | * | 3/1991 | Pennatto ....................... 474/113 |
| 5,030,173 | A | * | 7/1991 | Bryant .......................... 474/136 |
| 5,048,069 | A | | 9/1991 | Siczek |
| 5,050,202 | A | | 9/1991 | Yanome |
| 5,157,707 | A | | 10/1992 | Ohlson |
| 5,388,913 | A | | 2/1995 | Cawley et al. |
| 5,506,879 | A | | 4/1996 | Mori et al. |
| 5,636,259 | A | | 6/1997 | Khutoryansky et al. |
| 5,658,078 | A | | 8/1997 | Cawley |
| 5,671,266 | A | | 9/1997 | Linhart |
| 5,751,788 | A | | 5/1998 | Khutoryansky et al. |

(Continued)

*Primary Examiner* — Robert Siconolfi
*Assistant Examiner* — Stephen Bowes
(74) *Attorney, Agent, or Firm* — William Baxter, Esq.; Michael G. Smith, Esq.

(57) ABSTRACT

Systems, methods and apparatus are described in which in some embodiments, an automatic tensioner employs a puller assembly with a first indicia coupled to a fix base by a movement mechanism, a belt side assembly with a second indicia attached to one end of a belt, and a spring mechanism having a first end coupled to the puller assembly and a second end coupled to the belt side assembly. In some embodiments, the movement of the puller assembly in a first direction increases tension on the belt and movement of the puller assembly in a second direction decreases tension on the belt. In some embodiments, the spring mechanism compressed to exert a force in the first direction. In some embodiments, a movement mechanism is then adjusted until the first indicia and the second indicia are coincidental.

20 Claims, 7 Drawing Sheets

U.S. PATENT DOCUMENTS

| | | |
|---|---|---|
| 5,768,336 A | 6/1998 | Khutoryansky et al. |
| 5,870,450 A | 2/1999 | Khutoryansky et al. |
| 5,917,882 A | 6/1999 | Khutoryansky et al. |
| 6,030,305 A * | 2/2000 | Hood .......................... 474/109 |
| 6,128,006 A | 10/2000 | Rosenberg et al. |
| 6,155,716 A | 12/2000 | Okamura et al. |
| 6,240,582 B1 | 6/2001 | Reinke |
| 6,282,264 B1 | 8/2001 | Smith et al. |
| 6,459,226 B1 | 10/2002 | Zettel et al. |
| 6,552,499 B2 | 4/2003 | Derra et al. |
| 7,177,393 B2 | 2/2007 | Kanemitsu |
| 2002/0112016 A1 | 8/2002 | Peshkin et al. |
| 2003/0095635 A1 | 5/2003 | Moritake et al. |
| 2003/0137140 A1* | 7/2003 | Lutz et al. .................... 280/806 |
| 2004/0131159 A1 | 7/2004 | McKenna |

\* cited by examiner

AUTOMATIC TENSIONING MOUNT FOR BELTS

FIELD OF THE INVENTION

This invention relates generally to an automatic tensioner, and more particularly to an assembly for applying tension to a belt.

BACKGROUND OF THE INVENTION

Various tension adjusting systems have been conventionally proposed to enhance life expectancy of a transmitting belt by minimizing variation in tension in the course of operation. Belt tensioning of fixed end belts consists of a clamp at one end and a sliding clamp attached to a lead screw at the other end. This configuration can prove difficult when a specified tension is attempted. One approach to setting the tension is through the use of extra tools that measure belt tension or the torque applied to a lead screw. The extra tools are generally costly and have marginal precision.

Another approach is to use a procedure such as counting the number of turns given to the lead screw past a given amount of sag in the belt. Unfortunately, the number of turns procedure is highly operator dependent and belt specific.

For the reasons stated above, and for other reasons stated below which will become apparent to those skilled in the art upon reading and understanding the present specification, there is a need in the art for a more accurate processes of applying a specific intended tension to a belt even in cases where the belt length is not constant from one setup to another. There is also a need for an automatic tensioner where the parts themselves provide the indication of the intended tension and enable the indicator to be locked in placed at the intended tension.

BRIEF DESCRIPTION OF THE INVENTION

The above-mentioned shortcomings, disadvantages, and problems are addressed herein, which will be understood by reading and studying the following specification.

In one aspect, a belt tensioner comprising a puller assembly with a first indicia coupled to a fix base by a movement mechanism; a belt side assembly with a second indicia attached to one end of a belt, wherein movement in a first direction increases tension on the belt and movement in a second direction decreases tension on the belt; and a spring mechanism having a first end coupled to the puller assembly and a second end coupled to the belt side assembly, the spring mechanism being compressed so as to exert a force in the first direction.

In another aspect, a movement mechanism causes the puller assembly to move in the first direction or in the second direction.

In yet another aspect, the movement mechanism is a lead screw; the lead screw being rotatably engaged with a threaded collar.

In yet another aspect, the spring mechanism further comprises one or more low stiffness springs.

In another aspect, lock mechanism for locking the puller assembly and the belt side assembly when the first indicia and the second indicia are coincidental.

In another aspect, the belt attached to the belt side assembly has very high stiffness.

In another aspect, the puller assembly is a puller pulley assembly; the belt side assembly is a pulley assembly; the spring mechanism comprises one or more low stiffness torsional springs.

In still yet a further aspect, method for automatically tensioning a belt by performing the following actions: engaging a puller assembly with a first indicia coupled to a fix base by a movement mechanism; engaging a belt side assembly with a second indicia attached to one end of a belt, wherein movement in a first direction increases tension on the belt and movement in a second direction decreases tension on the belt; engaging a spring mechanism having a first end coupled to the puller assembly and a second end coupled to the belt side assembly, the spring mechanism being compressed so as to exert a force in the first direction; and adjusting the movement mechanism until the first indicia and the second indicia are coincidental.

In yet another aspect, the movement mechanism causes the puller assembly to move in the first direction or in the second direction.

In yet another aspect, the movement mechanism is a lead screw; the lead screw rotatably engaged with a threaded collar.

In another embodiment, the spring mechanism comprises one or more low stiffness springs.

In yet another aspect, locking the puller assembly and the belt side assembly when the first indicia and the second indicia are coincidental by engaging a lock mechanism.

In another aspect, the belt attached to the belt side assembly has very high stiffness.

In yet a further aspect, a system for tensioning a belt comprising: a base structure; a linear guide attached to said base structure, said linear guide having a major axis aligned with one axis of motion; a carriage arranged on said linear guide such that motion of said carriage is limited to being along said major axis; a belt attached to said carriage such that motion of said carriage along said major axis towards the base structure increases tension on the belt and movement away from the base structure decreases tension on the belt.

In yet another aspect the carriage further comprises: a puller assembly with a first indicia; a belt side assembly with a second indicia attached to one end of the belt; and a spring mechanism having a first end coupled to the puller assembly and a second end coupled to the belt side assembly, the spring mechanism being compressed so as to exert a force in the first direction.

In another aspect, the linear guide is a lead screw; the lead screw rotatably engaged with a threaded collar.

In yet another aspect, the spring mechanism comprises one or more low stiffness springs.

In yet another aspect, lock mechanism for locking the puller assembly and the belt side assembly when the first indicia and the second indicia are coincidental.

Still another aspect, the belt attached to the belt side assembly has very high stiffness.

In yet a further aspect, the puller assembly is a puller pulley assembly; the belt side assembly is a pulley assembly; the spring mechanism comprises one or more low stiffness torsional springs.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
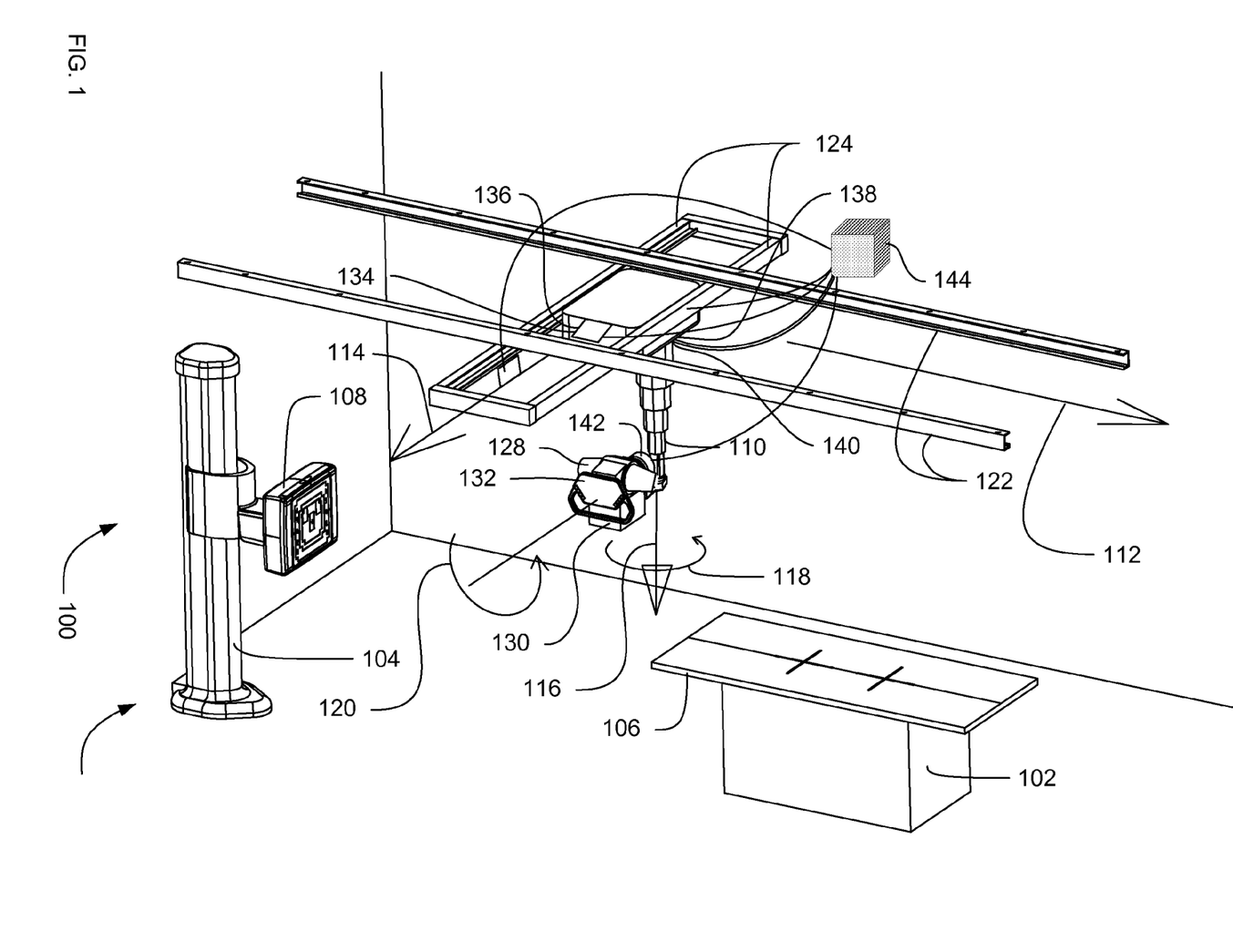
FIG. 1 is a diagram illustrating a system-level overview of an overhead tube support for a digital radiographic system where the present technique is incorporated.

FIG. 1 is a diagram illustrating a system-level overview of an embodiment of a radiographic positioning system 100. System 100 improves the accuracy of positioning of the tube mount assembly, maintains proper alignment of the tube mount assembly with the radiographic image receptors over the full range of travel of the tube mount assembly, provides an ability to correct for imperfections in geometry in the tube mount assembly and to allow for greater tolerance in precision in manufacturing and installation, and reduces confusion of the operator in the relationship between the function of the switches and the motion of the overhead tube support (OTS).

System 100 includes a radiographic table 102 and/or a radiographic wallstand 104. The radiographic table 102 and the wallstand 104 each contain an image receptor, 106 and 108, respectively.

An overhead tube support (OTS) 110 for performing diagnostic imaging procedures is also included. The OTS 110 provides three linear motions (longitudinal X 112, lateral Y 114 and vertical Z 116) which are perpendicular to each other, and two rotational rotations (rotation about the vertical axis "a" 118, and rotation about one horizontal axis "b" 120).

Longitudinal positioning rails 122 are mounted to a ceiling (not shown). Lateral positioning rails 124 move along the longitudinal positioning rails 122 in the longitudinal X 112 motion. In other embodiments, the lateral positioning rails 124 are mounted to a ceiling and the longitudinal positioning rails 122 move along the lateral positioning rails 124 in the lateral Y 114 motion.

A carriage 126 moves along lateral positioning rails 124 in the lateral Y 114 motion. The OTS 110 is mounted on the carriage 126. A tube mount assembly 132 includes an X-ray source 128 and collimator 130. The tube mount assembly 132 is mounted to the OTS 110. The tube mount assembly 132 and/or the OTS 110 rotate about the vertical "a" 118 axis and the vertical "b" 120 axis.

The OTS 110 can be positioned at any attitude and position within the reaches of radiographic system 100. Positioning the OTS 110 in any attitude and position is important in achieving alignment of the OTS 110 to an image receptor for imaging of a subject that is positioned on the radiographic table 102 or the radiographic wallstand 104. The alignment of the OTS 110 with an image receptor may be directed and/or controlled automatically by a control unit 144 or the alignment may be directed and/or controlled manually.

The lateral positioning rails 124 are operably coupled to the longitudinal positioning rails 122 through one or more first motorized drives 134. The carriage 126 is operably coupled to the lateral positioning rails 124 through one or more second motorized drives 136. In some embodiments, the OTS 110 is operably coupled to the carriage 126 through one or more third motorized drives 138 that rotates the OTS about the vertical Z 116. In some embodiments, the OTS 110 is also operably coupled to the carriage 126 through one or more fourth motorized drives 140 that extends the OTS along the vertical Z 116. In some embodiments, the X-ray source 128 is operably coupled to the OTS 110 through one or more fifth motorized drives 142 that rotate the X-ray source 128 about the horizontal axis "b" 120.

Each motorized drive includes a motor, and a position feedback measuring device, and in some embodiments a clutch and/or a lock or a brake. Each position feedback measuring device further includes a potentiometer, an encoder, a resolver, or a similar device. In the embodiments that lack a clutch, an efficient motor (having high quality bearings and high quality gears) is directly coupled, so that in manual motion the operator cause rotation of the motor armature as well as the OTS.

A control unit 144 is operably coupled to the one or more first motorized drives 134, the one or more second motorized drives 136, the one or more third motorized drives 138, the one or more fourth motorized drives 140 and the one or more fifth motorized drives 142. The control unit 144 controls operation of the motorized drives, which positions the X-ray source 128 and collimator 130 into alignment with a radiographic receptor 106 or 108.

In some implementations, more than one control unit 144 is included in system 100. Each control unit controls one or more motorized drives 134, 136, 138, 140 and/or 142. For example, in one implementation system 100 includes one control unit for each motorized drive. Each control unit communicates with the other control units, directly, or through other computers. Each control unit includes a processor.

The control unit 144 improves the accuracy of positioning of the apparatus 128 and 130. The control unit 144 also maintains proper alignment of the apparatus 128 and 130 with the radiographic image receptors 106 and 108 over the full range of travel of the apparatus 128 and 130. The control unit 144 also provides an ability to correct for imperfections in geometry in the apparatus and to allow for greater tolerance in precision in manufacturing and installation. The control unit 144 also reduces confusion of the operator in the relationship between the function of the switches and the motion of the OTS because the positioning of the apparatus 128 and 130 is performed by the control unit 144.

The system level overview of the operation of an embodiment has been described in this section of the detailed description. A control unit 144 controls the motorized drives to position the X-ray source 128 and collimator 130 into alignment with a radiographic receptor 106 or 108.

While the system 100 is not limited to any particular radiographic table 102, radiographic wallstand 104, image receptors 106 and 108, OTS 110, longitudinal positioning rails 122, lateral positioning rails 124, a carriage 126, X-ray source 128, collimator 130 and control unit 144. For sake of clarity, a simplified radiographic table 102, radiographic wallstand 104, image receptors 106 and 108, OTS 110, longitudinal positioning rails 122, lateral positioning rails 124, a carriage 126, X-ray source 128, collimator 130, and control unit 144 have been described.

Figure 2:
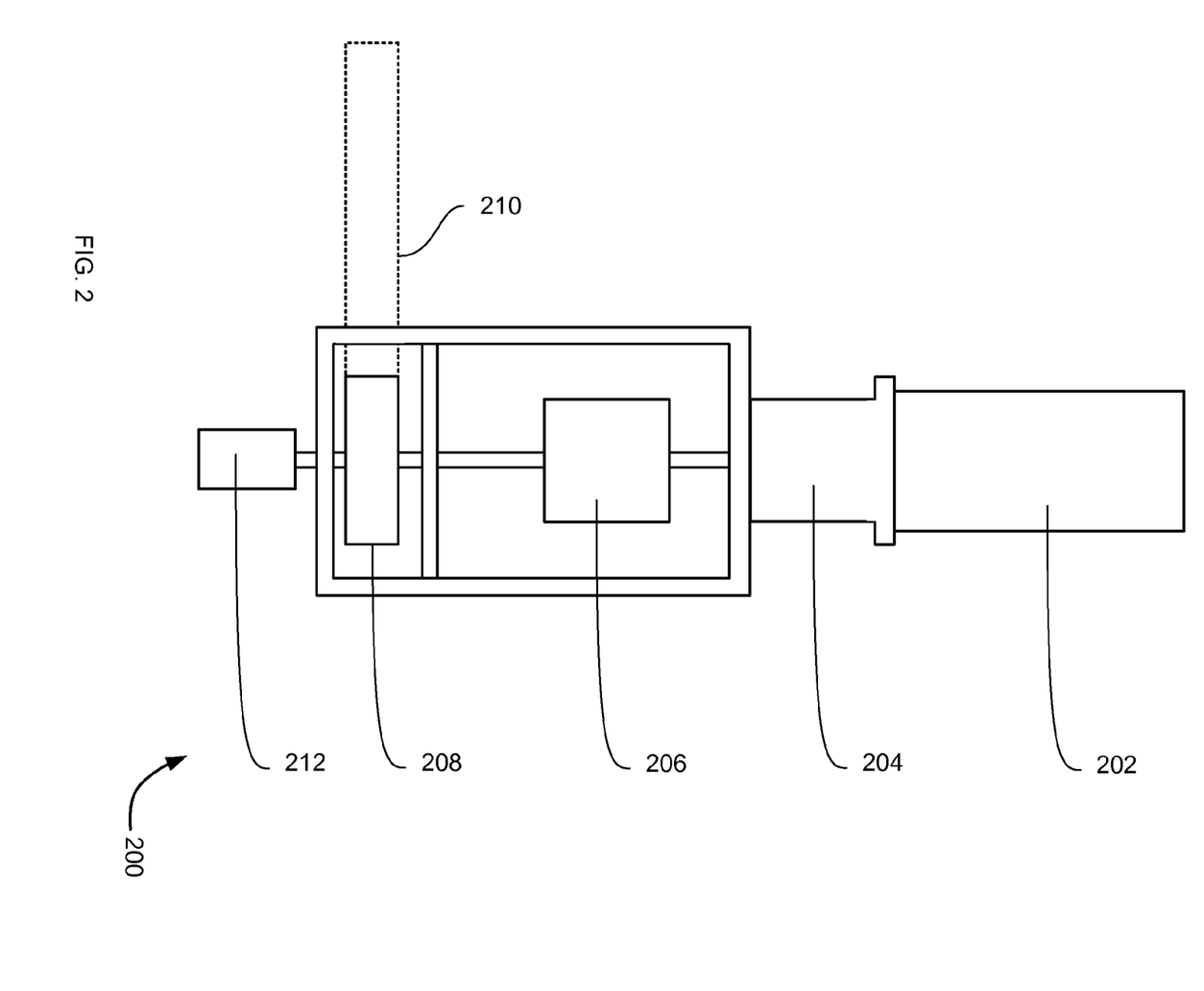
FIG. 2 is a diagram illustrating an engaged belt in a digital radiographic system.

FIG. 2 is a top-view of a motorized drive apparatus 200 showing an application of a belt in a digital radiography positioning system as described above in FIG. 1.

Motorized drive apparatus 200 includes driving means 202, such as direct current (DC) motor. In some embodiments, motorized drive apparatus 200 further includes a speed reduction means 204, such as a gear reducer. In some embodiments motorized drive apparatus 200 further includes a clutch 206 or similar means to engage and disengage the driving means, allowing manual motion of the equipment when disengaged, and permitting powered driving of the equipment by the driving means when engaged. Motorized drive apparatus 200 additionally includes a wheel 208 engaged to a belt 210, cable, or toothed wheel connecting the driving means to a stationary member, allowing the driving means 202 to drive the equipment such as a tube mount assembly 132 relative to the stationary member. Motorized drive apparatus 200 also includes a position measuring means 212, such as an encoder, potentiometer or a resolver.

In some embodiments, the motorized drive apparatus 200 is coupled to the controller 206 in FIG. 2 or control unit 144 in FIG. 1 to provide computer control for the motorized drive apparatus 200.

In some embodiments, a brake or lock is attached to a belt, a cable, or a toothed wheel 210, to provide additional resistance to manual motion when in the target or detent position.

Figure 3:
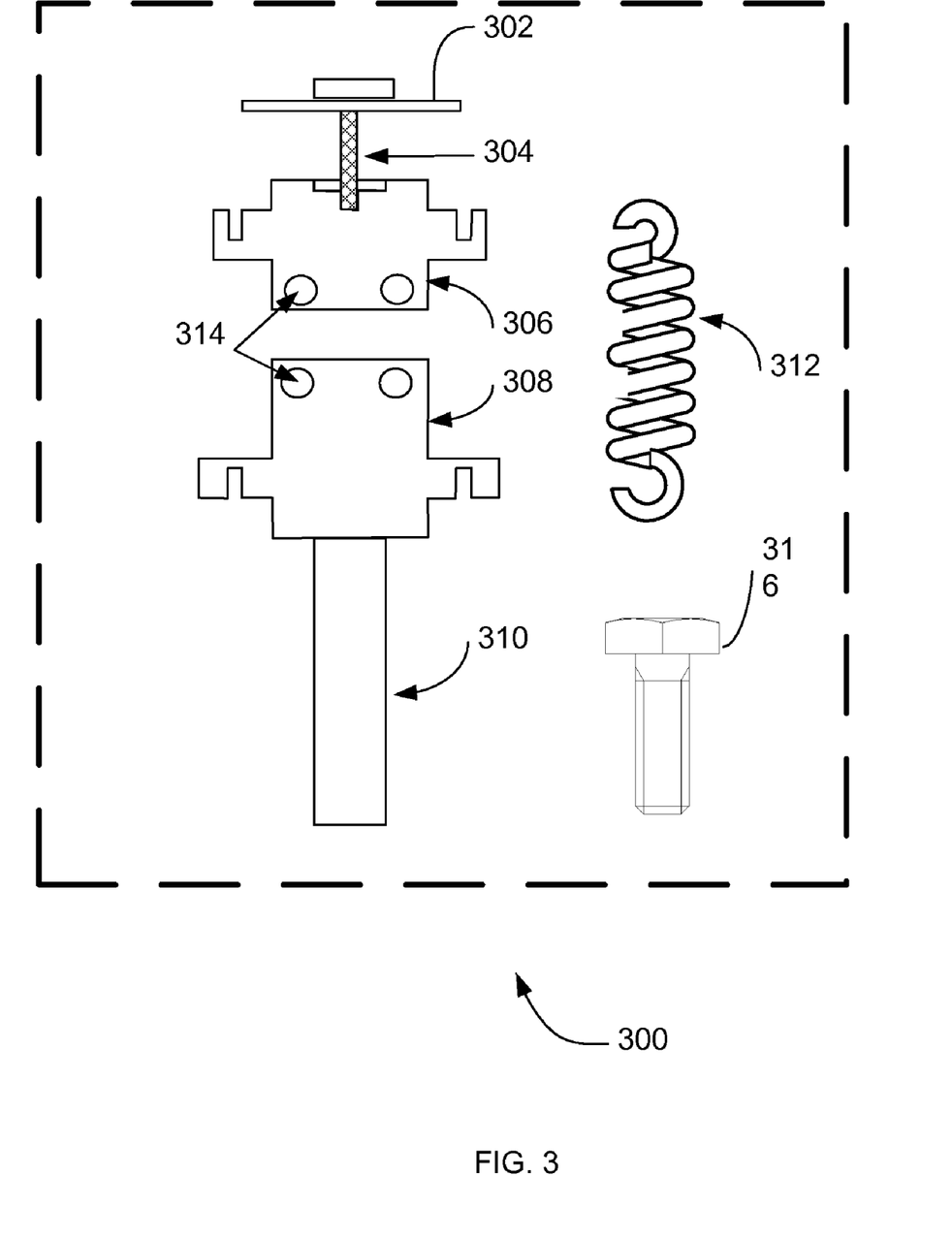
FIG. 3 is a diagram of a puller assembly, spring mechanism, belt side assembly, and movement mechanism in accordance to an embodiment.

FIG. 3 is a top view of the parts for an automatic tensioner 300 for fixed end belts. The automatic tensioner 300 solves the need for an automatic tensioner where the parts themselves provide an indication of the tension and enable the indicator to be locked in place at a tension. The automatic tensioner 300 combines a movement mechanism 304, a puller assembly 306, a belt end assembly 308, a spring mechanism, and a clamp assembly 316 to tension a belt without the need to count turns or extra tools.

The automatic tensioner 300 uses a puller assembly 306 that is attached to a fixed base 302 by a movement mechanism 304. The fixed base 302 can be a wall, the walls of a cabinet, or the walls of an enclosure where the invention is being practice. The movement mechanism 304 can be lead screw, a rod, wire, or any other mechanism that can cause movement of the puller assembly 306 in the direction fixed base 302. Lead screw 304 is a force imparting member that coaxially extends through or near the center of the puller assembly 304. Lead screw shaft 304 is threadably engaged with extended nut or collar (not shown). As lead screw 304 is turned by action of applying a torquing force like a wrench or screw driver, lead screw 304 moves axially along its major axis and producing movement or axis of motion of the puller assembly 306 is towards the fix base 302. This, in turn, increases belt (310) tension that is proportional to the movement brought about by the lead screw 304. The force created by the lead screw 304, the spring mechanism 312 force constant or stiffness, the puller mechanism's (306) force, and the belt end assembly 308 force exert tension at belt 310. Tension is applied to the belt 310, through the spring or springs 312 by winding the lead screw 304. Indicia 314 have been place on the puller assembly and the end belt assemblies at predetermined points. The indicia 314 could be one or more holes, markers, or notches. The indicia 314 will coincide, will align, or will be over each other at the point where a tension for the belt 310 is achieved. After a given amount of winding of the lead screw 304, the holes from the Puller and Belt Assemblies (306, 308) line up indicating the intended tension has been reached. When the tension is reached a clamping mechanism 316 or a set of screws 316 are attached to the two assemblies so as to hold the pieces in place and provide a unitary construction. Thus, the automatic tensioner 300 can be assembled by selecting a spring mechanism with known stiffness and machining indicia 314 or holes on the assemblies at a point that would produce the intended tension. The operator need not resort to measuring devices or extra tools to achieve the intended tension on the belt 310.

While the automatic tensioner 300 has been shown as a collection of parts that when assembled can be tuned by turning lead screw 304 to the intended tension for a given fixed end belt. These procedures could be performed by an aptly programmed digital computer with minimal experimentation. The assembly of parts by a computer is well known to those in the art. In addition, once the parts are known and combined in the arrangements shown in FIG. 5 and FIG. 6 a lead screw is turned until there is alignment of the respective indicia or holes. The procedure of turning of the lead screw can additionally be performed by a motorized system that is controlled by computer. Finally; the installation of the clamping mechanism can be performed by a controlled computer.

The automatic tensioner has been described in a linear format, but could be conceived in a similar construction in a rotational format. For instance, this spring could be a torsion spring, which reaches a set torque for the given radius pulley when two holes on the puller pulley and belt pulley line up. A feature such as a screw could be used to lock them then together.

Figure 4:
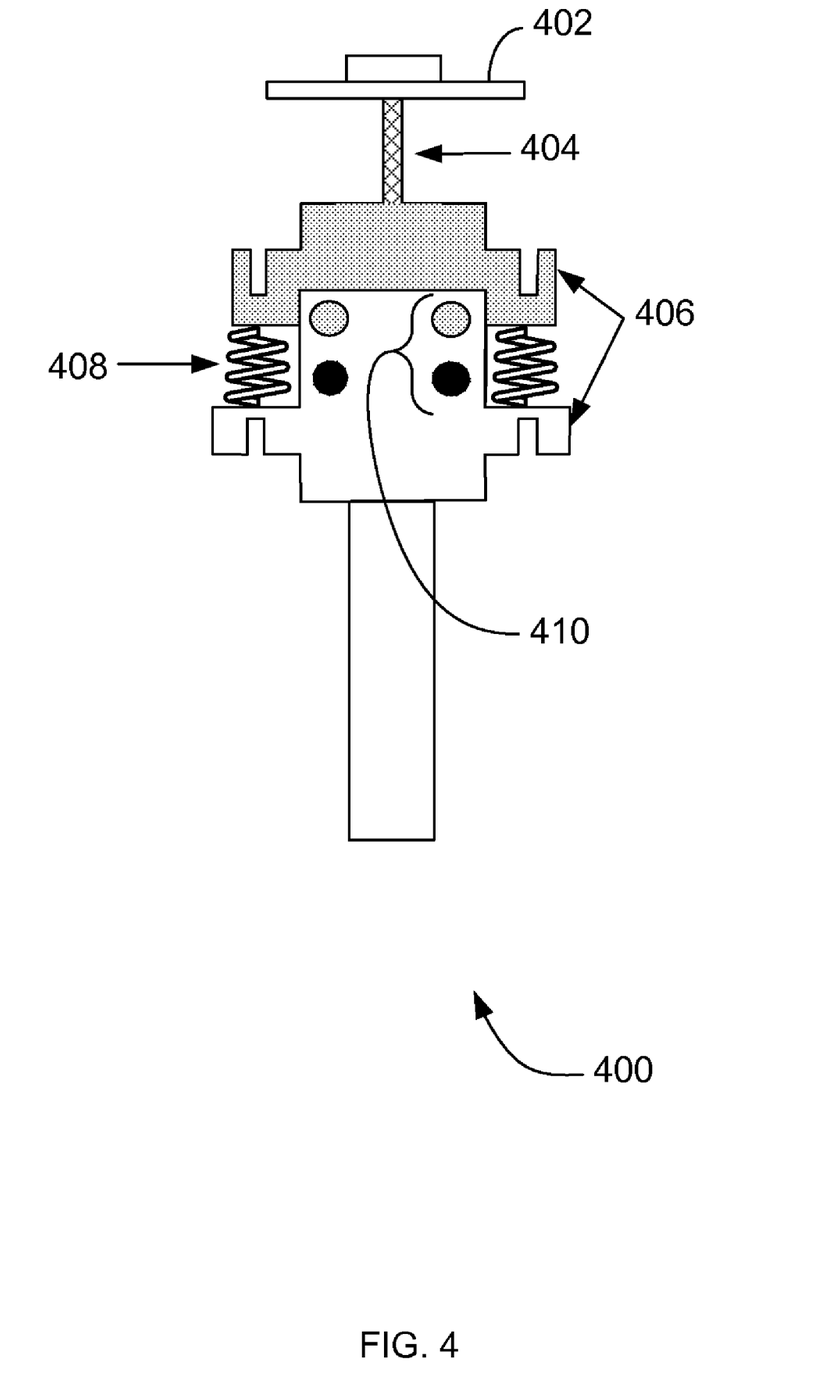
FIG. 4 is a diagram of a puller assembly, spring mechanism, belt side assembly, and movement mechanism combined in accordance to an embodiment.

FIG. 4 is a top view of an assembled automatic tensioner 400. The belt is not at the intended tension so for all practical purpose the belt is un-tensioned. The automatic tensioner 400 solves the need for an automatic tensioner where the parts themselves provide the indication of the intended tension and enable the indicator to be locked in placed at the intended tension.

The automatic tensioner 400 is shown with the elements combined to perform automatic tensioning by simply turning the lead screw 404. As shown the puller assembly and the belt end assembly have been attached and held in place by the spring mechanism 408. The indicia 410 on the puller assembly and the belt end assembly are not yet in coincidence or on top of each other. Note that in this state the respective indicia 410 are separated by a distance that is along the axis of movement of the lead screw 404. In the illustration the lighter indicia 410 is for the belt assembly 308 and the darker (Black) indicia 410 is for the puller assembly 306. The lead screw 404 is rotated to increase or decrease the force against puller/belt end assembly 406. The turning of the lead screw 404 moves the puller assembly and belt end assembly (406) to move in the direction of the fixed base 402. This movement causes the spring mechanism 408 to stretch. The spring mechanism 408 opposes the movement. The opposing force of the spring mechanism 408 is known as the force constant (K) or stiffness. The net result of the movement of the lead screw 404 and the movement due to the force constant (K) is that the distance between the respective indicia 410 decreases while at the same time the tension at the belt approaches the intended tension. The vertical force (direction of fixed base) is proportional to the belt tension. The correct or preferred belt tension is then obtained by rotating the lead screw until the indicia 410 are over each other.

Figure 5:
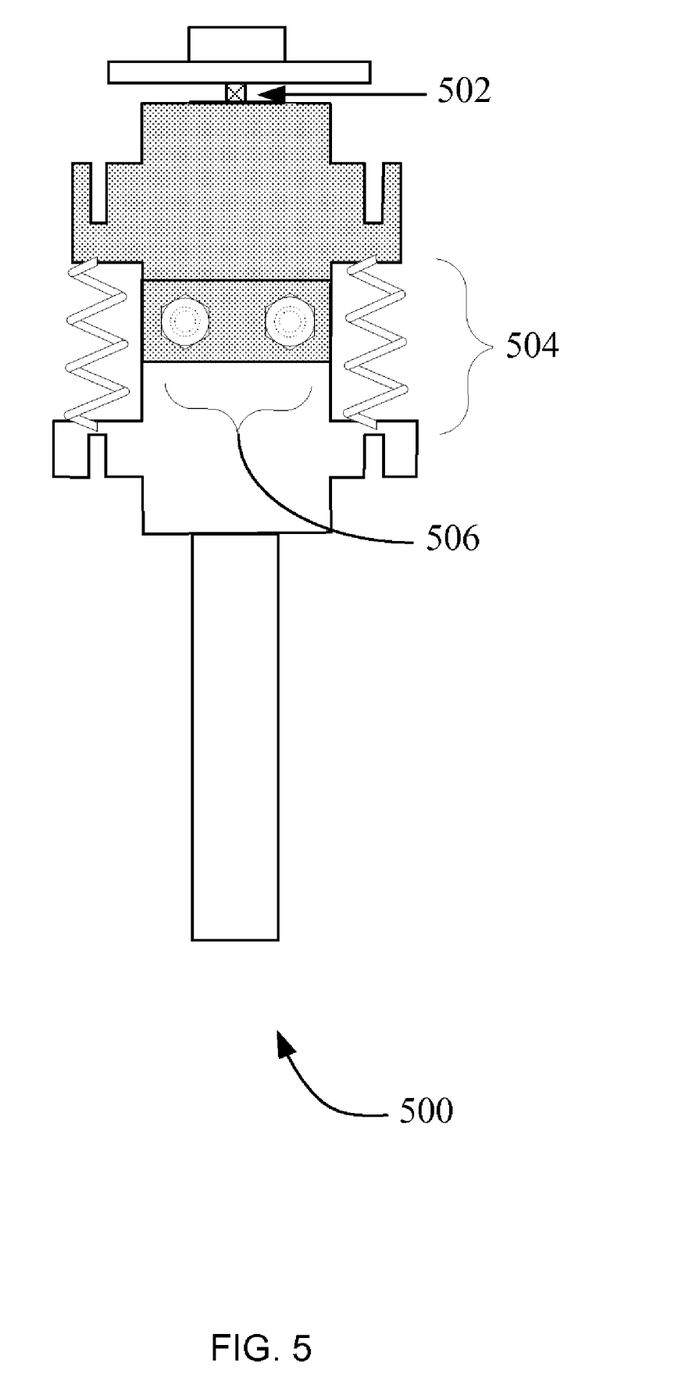
FIG. 5 is a diagram of a puller assembly, spring mechanism, belt side assembly, and movement mechanism while in tension in accordance to an embodiment.

FIG. 5 is a top view of a locked in place tensioned belt using the automatic tensioner. The automatic tensioner solves the need for an automatic tensioner where the parts themselves provide the indication of the intended tension and enable the indicator to be locked in placed at the intended tension.

The lead screw 502 has been turned enough to cause a substantially shortening of the distance between the puller/belt end assemblies 406 and the fixed base 402. When the indicia of the two assemblies 506 are in place, which is on top of each other, a clamp or a locking mechanism is used to lock it in place. The spring mechanism 408 has been stretched by a certain distance 504. This distance or elongation 504 is proportional to the applied force (F) of the lead screw 404, the puller assembly 306 pulling on the belt end assembly 308, and the interaction of the force constant (K) or stiffness of spring mechanism 408 to those forces. The stiffness of the spring mechanism 408 is transferred to the fixed end belt 310 through the attached belt end assembly. The forces cause the indicia at the puller assembly (306) to move up; the force can be applied until there is alignment of the respective indicia of the belt end assembly (308) and puller assembly (306). This is the intended tension for the fixed end belt (310), when this is reached a clamp mechanism 316 (one or more screw) is placed on the assembly to hold the mechanism in place.

In the previous section, apparatus of the operation of an embodiment was described. In this section, the particular methods performed by an operator or user of such an embodiment are described by reference to a series of flowcharts.

Figure 6:
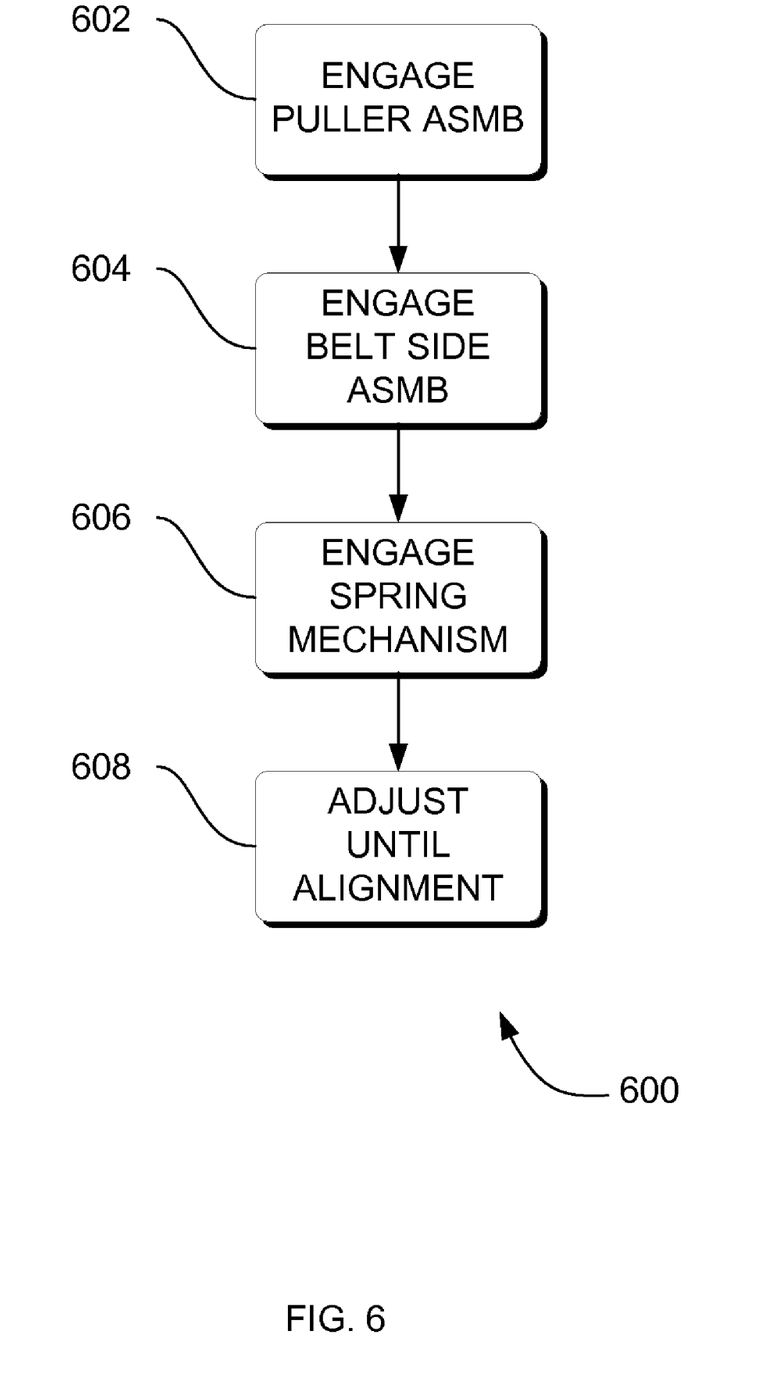
FIG. 6 is a flowchart of a method of automatic tensioning according to an embodiment.

FIG. 6 is a flowchart of a method 600 for automatic tensioning according to an embodiment. Method 600 solves the need in the art for an automatic tensioner where the parts themselves provide the indication of the intended tension and enable the indicator to be locked in placed at the intended tension.

Action 602 requires engaging a puller assembly that is preferably equipped with a lead screw as described with reference to item 306 in FIG. 3. The puller assembly should have indicia that would correspond to the belt size and/or the intended tension for the fixed end belt. After action 602 is performed control passes to action 604 for further processing.

In action 604 engaging a belt side assembly having an indicia that would correspond to the belt size and/or the intended tension for the fixed end belt. After the belt side assembly has been engage control passes to action 606 for further processing.

In action 606 engaging a spring mechanism 312 having one or more springs. Most importantly the spring is selected with a known spring rate or stiffness (K) in accordance with the well known Hook's law. For accurate tensioning, using springs with low stiffness as this makes the final tension less sensitive to parts manufacturing accuracy. Once the stiffness of the spring is known, the holes or indicia can be machined on the puller assembly and the belt side assembly. Once the spring mechanism is selected control passes to action 608 for further processing.

In action 608, the lead screw 304 is turned causing movement of the puller assembly upward and causing the spring to be stretched in the direction of motion. When the indicia of the assemblies are overlapping a screw is attached so as to preserve the desire tension.

Figure 7:
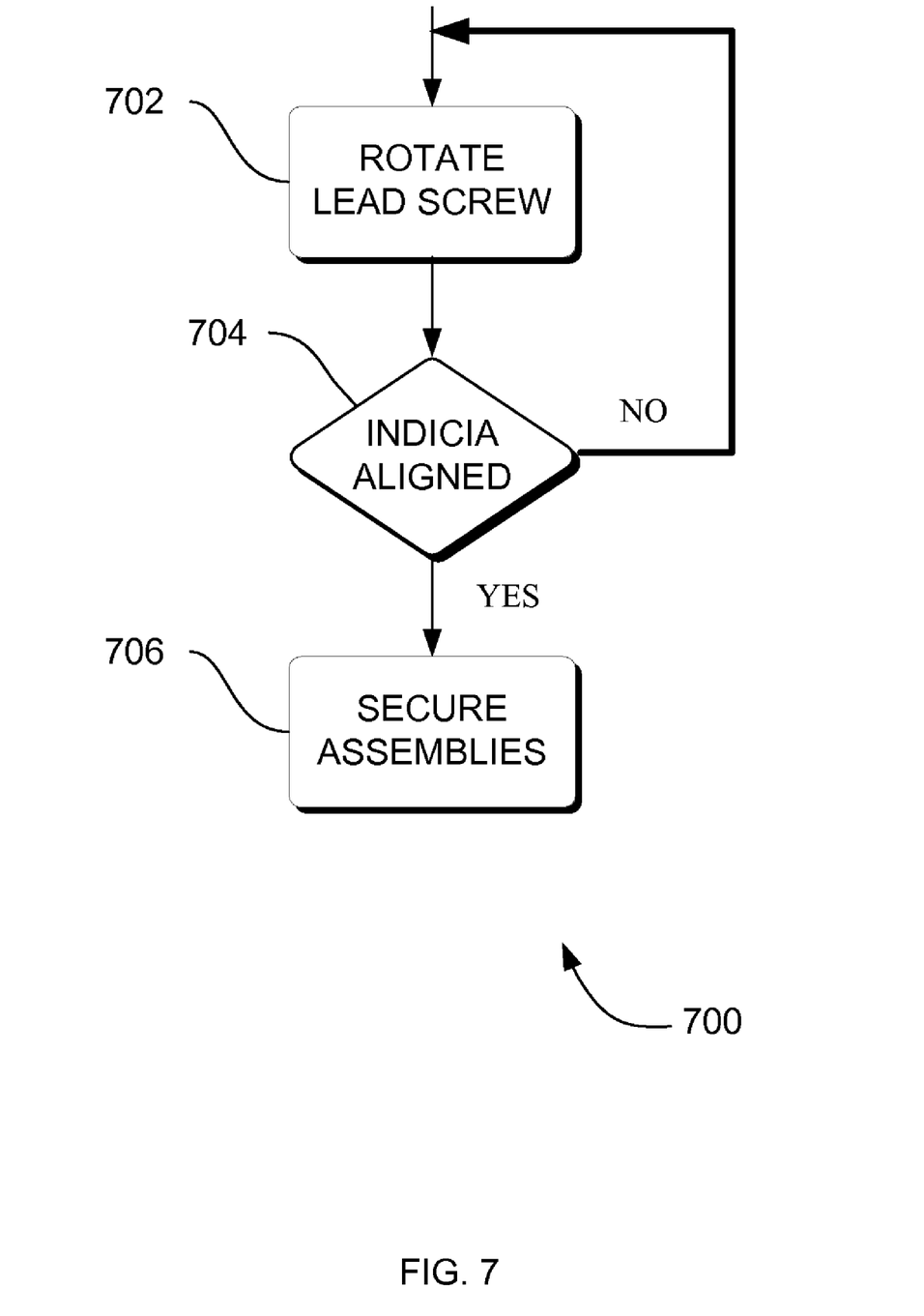
FIG. 7 is a flowchart of a method of automatic tensioning by aligning features of assemblies according to an embodiment.

FIG. 7 is a flowchart of a method 700 for automatic tensioning according to an embodiment. Method 700 solves the need in the art for an automatic tensioner where the parts themselves provides the indication of the intended tension and enable the indicator to be locked in placed at the intended tension.

Method 700 represents action(s) or procedure(s) that an operator can follow to achieve automatic tensioning of a fixed end belt. Therefore, after a given amount of winding the lead screw 702, the holes from the puller and belt assemblies line up 704 indicating tension is reached. After installation, very high stiffness in the belt is provided by inserting a piece into the aligning features such that they are locked relative to each other 706.

CONCLUSION

An automatic tensioner is described. Although specific embodiments are illustrated and described herein, it will be appreciated by those of ordinary skill in the art that any arrangement which is calculated to achieve the same purpose may be substituted for the specific embodiments shown. This application is intended to cover any adaptations or variations. For example, although described in mechanical terms, one of ordinary skill in the art will appreciate that implementations can be made by computer controlled motors or any other machine that provides the required function.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments.

We claim:

1. An apparatus comprising:
a motorized drive;
a belt engaged to the motorized drive, the belt including a belt tensioner, the belt tensioner comprising
a puller assembly having a first indicia, the puller assembly being coupled to a fixed base by a screw;
a belt side assembly with a second indicia, the belt side assembly being attached to one end of a belt, wherein movement of the belt side assembly in a first direction increases tension on the belt and movement of the belt side assembly in a second direction decreases tension on the belt; and
a spring mechanism having a first end attached to the puller assembly and a second end coupled to the belt side assembly, the spring mechanism being compressed so as to exert a force in the first direction,
wherein the first indicia and the second indicia are both holes having about equal diameters.

2. The apparatus of claim 1, wherein the screw causes the puller assembly to move in the first direction or in the second direction.

3. The apparatus of claim 1, wherein
the screw further comprises being the screw being rotabably engaged with a threaded collar.

4. The apparatus of claim 1, wherein the spring mechanism further comprises one or more low stiffness springs.

5. The apparatus of claim 1, further comprising:
a lock mechanism for locking the puller assembly and the belt side assembly when the first indicia and the second indicia are coincidental.

6. The apparatus of claim 1, wherein the belt attached to the belt side assembly has very high stiffness.

7. The apparatus of claim 1, wherein
the puller assembly further comprises a puller pulley assembly;
the belt side assembly further comprises a pulley assembly;
the spring mechanism further comprises one or more low stiffness torsional springs.

8. A method for automatically tensioning a belt, the method comprising:
- engaging a puller assembly having a first indicia, the puller assembly being coupled to a fixed base by a screw, the screw being threadably engaged to the puller assembly;
- engaging a belt side assembly with a second indicia;
- attaching an end of a belt to the belt side assembly;
- engaging the belt to a motorized drive, wherein movement of the belt side assembly in a first direction increases tension on the belt and the motorized drive and movement of the belt side assembly in a second direction decreases tension on the belt and the motorized drive;
- engaging a spring mechanism having a first end attached to the puller assembly and a second end coupled to the belt side assembly, the spring mechanism being compressed so as to exert a force in the first direction; and
- adjusting the screw until the first indicia and the second indicia are coincidental,
- wherein the first indicia and the second indicia are both holes having about equal diameters.

9. The method of claim 8, wherein the screw causes the puller assembly to move in the first direction or in the second direction.

10. The method of claim 8, wherein
the screw further comprises the screw being rotatably engaged with a threaded collar.

11. The method of claim 8, wherein the spring mechanism further comprises one or more low stiffness springs.

12. The method of claim 8, further comprising:
locking the puller assembly and the belt side assembly when the first indicia and the second indicia are coincidental by engaging a lock mechanism.

13. The method of claim 8, wherein the belt attached to the belt side assembly has very high stiffness.

14. The apparatus comprising:
- a motorized drive;
- a belt engaged to the motorized drive, the belt including a belt tensioner,
- the belt tensioner comprising
  - a base structure;
  - a linear guide attached to the base structure, the linear guide having a major axis aligned with one axis of motion;
  - a carriage arranged on the linear guide such that motion of the carriage further comprises limited to being along the major axis;
  - a belt attached to the carriage such that motion of the carriage along the major axis towards the base structure increases tension on the belt and movement of the belt side assembly away from the base structure decreases tension on the belt, wherein the carriage further comprises a puller assembly with a first indicia and a belt side assembly with a second indicia, the belt side assembly being attached to one end of the belt, wherein the first indicia and the second indicia are both holes having about equal diameters; and
  - a spring mechanism having a first end attached to the puller assembly and a second end coupled to the belt side assembly.

15. The apparatus of claim 14, wherein the carriage further comprises:
the spring mechanism being compressed so as to exert a force in the first direction.

16. The apparatus of claim 15, wherein
the linear guide further comprises a lead screw, and
the lead screw further comprises the lead screw being rotatably engaged with a threaded collar.

17. The apparatus of claim 15, wherein the spring mechanism comprises one or more low stiffness springs.

18. The apparatus of claim 15, further comprising:
a lock mechanism for locking the puller assembly and the belt side assembly when the first indicia and the second indicia are coincidental.

19. The apparatus of claim 15, wherein the belt attached to the belt side assembly has very high stiffness.

20. The apparatus of claim 15, wherein
the puller assembly further comprises a puller pulley assembly;
the belt side assembly further comprises a pulley assembly; and
the spring mechanism further comprises one or more low stiffness torsional springs.

* * * * *